Oct. 17, 1967    R. BERGMAN, SR    3,346,911
METHOD AND APPARATUS FOR PULLING HIDES
FROM CARCASSES OF ANIMALS
Filed Aug. 19, 1965    2 Sheets-Sheet 1
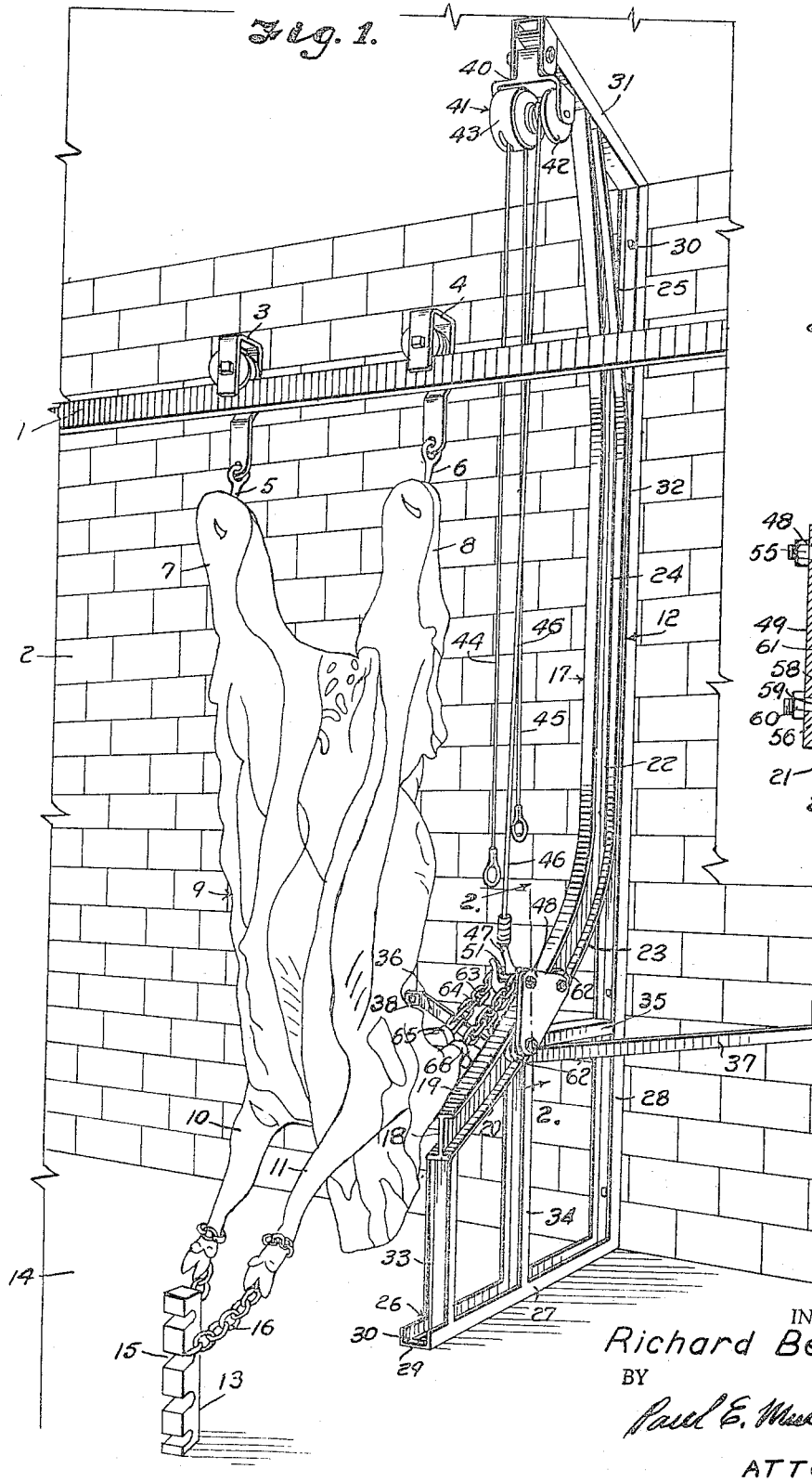
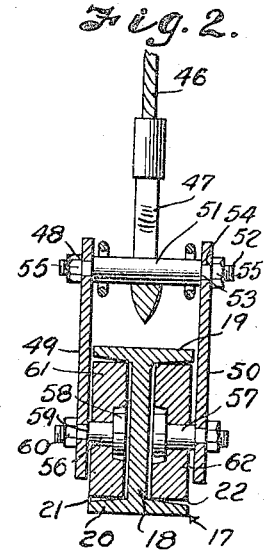
INVENTOR.
Richard Bergman Sr.
BY
Paul E. Mullendore
ATTORNEY

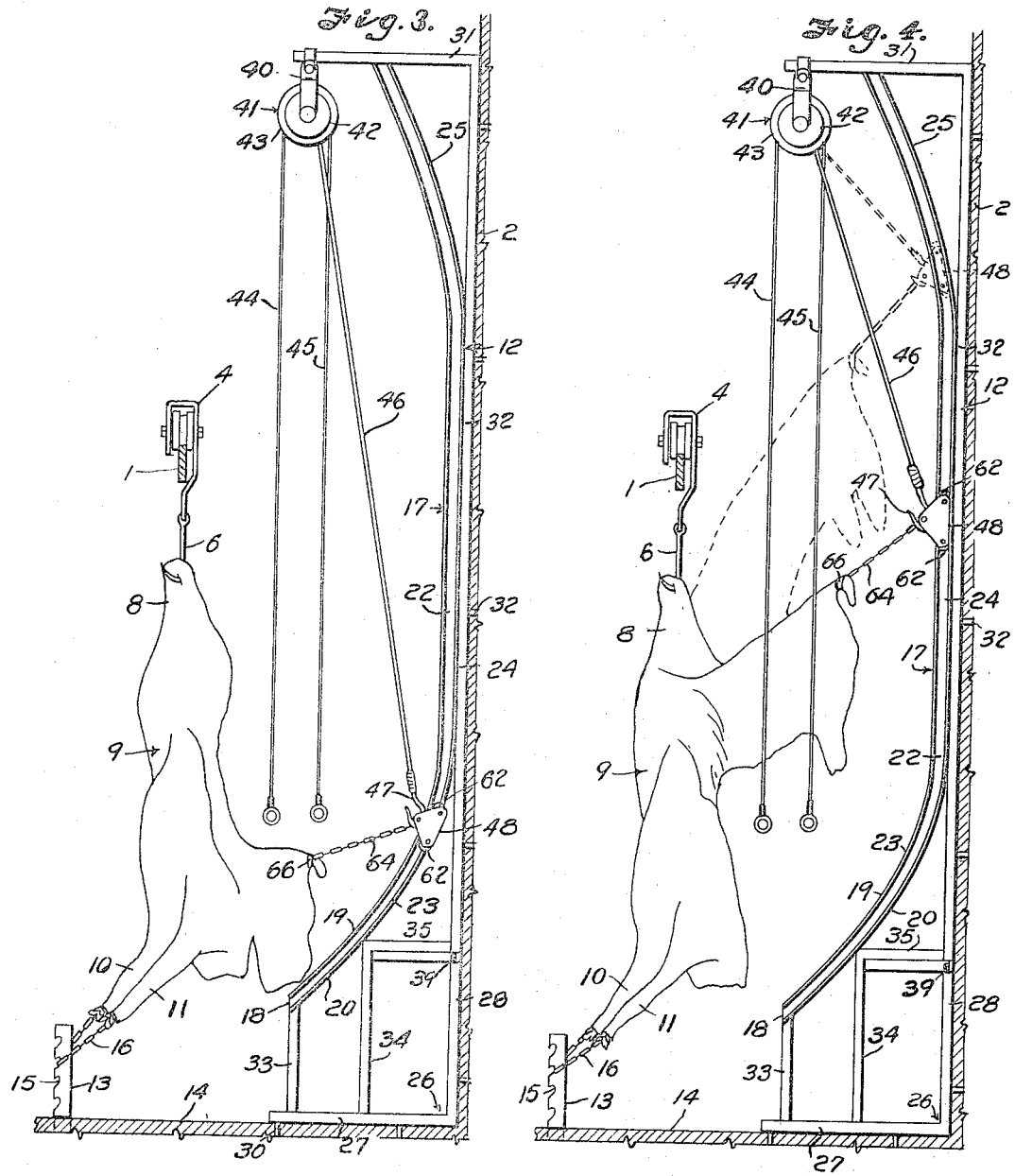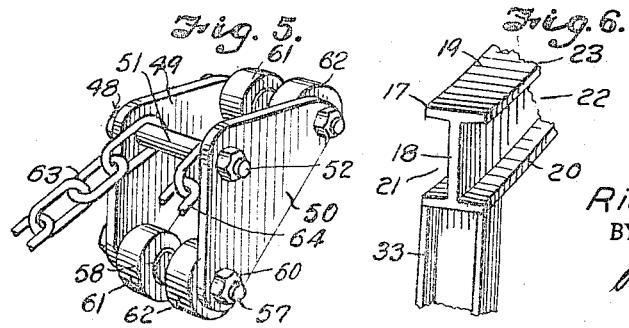

United States Patent Office 3,346,911
Patented Oct. 17, 1967

3,346,911
METHOD AND APPARATUS FOR PULLING HIDES FROM CARCASSES OF ANIMALS
Richard Bergman, Sr., Griggsville, Ill.
(% Bergman Meat Packing Co., Pittsfield, Ill. 62363)
Filed Aug. 19, 1965, Ser. No. 480,901
6 Claims. (Cl. 17—21)

This invention relates to a process and apparatus for pulling hides from carcasses of animals, and has for its principal object to quickly and easily remove hides, leaving a very acceptable finished carcass without damaging the hide.

In carrying out the invention, the carcass of the slaughtered animal is suspendingly supported by the front and rear legs. The viscera may or may not be removed prior to pulling off the hide, but the skin of the carcass is initially slit lengthwise along the underside of the carcass and lengthwise along the inner sides of the rear and forelegs, after which the skin is initially pulled back from the carcass at the sides of the slits and from the forelegs.

A pulling apparatus is secured to the loosened skin of the forelegs and a pulling force is applied rearwardly and along the back of the carcass in controlled angular directions, as the pulling force travels along the full length of the carcass.

Other objects of the invention are to provide a simple and relatively inexpensive pulling apparatus that is easily and economically installed in a slaughtering plant and which is easily operated in accordance with the loosening of the hide under power at a rate controlled by the operator, so as to avoid tearing and damaging of the hide, as well as the fell or membraneous covering which surrounds the carcass.

In accomplishing the above and other objects of the invention, I have provided an improved method and an improved apparatus for carrying out the method, the preferred form of which is illustrated in the accompanying drawings, wherein:

FIG. 1 is a perspective view of the pulling apparatus, showing a suspended carcass initially skinned out, and illustrating start of the hide pulling operation.

FIG. 2 is an enlarged section through the hoisting carriage on the line 2—2 of FIG. 1, to better illustrate the construction thereof.

FIG. 3 is a side elevational view of the apparatus showing the hoisting carriage nearing the vertical portion of the guide rail, during which time the hide has been pulled loose from the neck and parts of the sides of the carcass.

FIG. 4 is a similar view showing further progress of the hoisting carriage in full lines, and a still further advancement in dotted lines in which the hide is substantially pulled from the carcass.

FIG. 5 is a perspective view of the hoisting carriage as it appears when removed from the guide rail.

FIG. 6 is a perspective view of the lower end of the guide rail.

Referring more in detail to the drawings:

While the carcass may be suspended and the pulling force applied along the length of the carcass suspended in various directions, the most convenient position for suspending a carcass is perpendicular, and the present drawings illustrate means for suspending the carcass from the rear legs, with the forelegs hanging downwardly, and the apparatus for applying the pulling force is generally perpendicular.

Therefore, the present drawings illustrate an overhead track 1 that is spaced laterally from a vertical support 2, such as the wall of a building as illustrated in FIG. 1. The track 1 may, if desired, extend from the place of slaughtering and initially preparing the carcass for dehiding to the apparatus for removal of the hide. Supported on the track 1 are preferably pairs of hangers 3 and 4 carrying hooks 5 and 6 that swing from the hangers below the track. The rear legs 7 and 8 of the carcass 9 are adapted to be engaged by the hooks 5 and 6 so that the carcass is suspended from the track with the forelegs 10 and 11 lowermost. The carcass, thus suspended, is carried along on the track 1 to the pulling apparatus generally indicated by the numeral 12.

The pulling apparatus 12 includes a post 13 extending from the floor 14 of the building at a point spaced from the wall 2 and from the vertical plane of the track. The post 13 may be set in the floor or otherwise secured to the floor so that it is rigid, and is provided with a vertical series of chain anchoring portions, such as notches 15. The forelegs 10 and 11 are secured to the post by flexible means, such as a chain 16, passing through one of the notches or which is wrapped about the post, as desired, to cooperate with the hooks 5 and 6 in holding the carcass in substantially fixed position.

The pulling apparatus 12 also includes a guide rail 17, for example, of I-beam cross section, having a web 18 and transversely extending upper and lower flanges 19 and 20 cooperating with the web in forming guide grooves 21 and 22 extending along the length of the I-beam. In order to control the direction of pull on the hide, the I-beam is shaped to provide a lower upwardly curving portion 23 merging into a vertical portion 24 which terminates in a slightly curving forwardly inclined portion 25. The curved portion is of a length to extend from substantially the horizontal plane of the forelegs to the horizontal plane substantially midway of the back of the carcass, and the vertical portion 24 is of a length so that the inclined portion 25 extends a sufficient distance above the carcass to accommodate the increasing length of the hide as it is pulled from the carcass, as later described.

The guide rail 17 is supported by a frame 26, having a base member 27, such as a channel, and a vertical member 28 secured to the rear end of the base member. The base and vertical members are preferably channels arranged so that the web portions 29 thereof engage flatly upon the floor 14 and wall 2 (FIG. 1), so that they may be rigidly fastened thereto by fastening devices, such as bolts 30. Fixed to the upper end of the vertical member of the frame is an arm 31, extending outwardly over the upper end of the inclined portion of the guide rail 17. The vertical portion 24 of the guide rail and upper end of the inclined portion 25 thereof are rigidly secured to the flanges 32 of the vertical member 28 and arm 31, as by welding or the like. The lower end of the curved portion 23 of the guide rail is rigidly supported from the base member 27 by uprights 33 and 34 and a transverse member 35 which extends between the upper end of the upright 34 and the vertical member 28 of the frame. The uprights 33 and 34 and the transverse member are preferably welded to the base and vertical member and to the guide rail, so that they constitute a substantially unitary structure.

The frame thus described is braced from the wall 2 at the respective sides of the frame by braces 36 and 37, which may be welded to one of the uprights, for example, the upright 34, and which extend outwardly and rearwardly for attachment to the wall by fastening devices 38 and 39.

Fixed to the projecting end of the arm 31 is a hanger 40 carrying a hoisting means 41 of any type that includes a reel or winding drum 42 and a rotating means 43, which may consist of a motor or mechanism for manual operation and adapted to be controlled by an operator standing on the floor at one or the other sides of the rail 17. Such controls may be depending cables 44 and 45 to provide for forward and reverse rotation of the reel. The hoist is preferably located on the hanger so that the rotational axis of the reel 42 is parallel with the track 1.

Wound upon the reel 42 is a cable 46 carrying a hook 47 adapted for connection with a carriage 48 which merely rolls along the guide rail responsive to the cable 46 to exert a pulling force on the hide. In the illustrated instance, the carriage 48 comprises substantially triangular shaped side plates 49 and 50 (FIGS. 2 and 5) suitably spaced apart to accommodate the guide rail 17 therebetween, for example, by a cross bar 51 having reduced threaded extensions 52 on the ends thereof to form stop shoulders 53 and extend through openings 54 in one corner of the plates to accommodate nuts 55 by which the plates are tightened against the stop shoulders 53. Similarly mounted at the other corners of the plate are studs 56 and 57. The studs have heads 58 and shoulder portions 59 spaced therefrom so that the heads are retained in spaced relation with the inner faces of the plates by nuts 60 mounted on threaded shanks of the studs. Freely rotatable on the studs are rollers 61 and 62 which roll within the guide grooves 21 and 22 of the guide rail, as best shown in FIGS. 1 and 2. The cross bar 51 also provides connection for flexible members such as chains 63 and 64, so that an end link of each of the chains may be threaded onto the cross beam in assembling of the carriage. The other end links of the chains 63 and 64 may carry clamping devices 65 and 66 by which the foreleg portions of the skin are secured, in a suitable manner.

In practicing the improved method and using the apparatus as illustrated and described, a slaughtered animal 9 is suspended from the mobile brackets 3 and 4 by impaling the rear legs 7 and 8 of the animal on the hooks 5 and 6 of the brackets so that the front legs are free of the floor. In the illustrated instance, the viscera has been removed, but this is optional. The viscera can just as well be removed after the hide has been pulled off, if desired.

The carcass is initially skinned out by cutting the skin along the underside of the body and along the inner sides of the rear and front legs. The skin is then peeled loose along sides of the slits without injuring the fell or membraneous covering of the carcass. The front legs 10 and 11 are secured to the post 13, using a notch suitable for the length of the animal.

The carcass is moved along the track 1 until it is between the post 13 and pulling frame 26. The front legs 10 and 11 are secured to the post 13 by the chain 16, the ends of the chains being secured just above the hoofs, and a notch 15 is used according to the length of the carcass. The carcass is firmly secured between the track 1 and the anchoring post 13, which, with its weight, makes it resistant to lateral movement in the dehiding procedure. The skin of the front legs is engaged by the clamps 65 and 66 or otherwise secured to the pulling carriage 48 by the chains 63 and 64, the carriage 48 being on the lower end of the curved portion 23 of the guide rail. With the hook 47 of the pulling cable 46 engaged with the cross bar 51 of the carriage, the flexible controls 44 and 45 are operated to cause the reel 42 of the hoisting means 41 to wind the cable 46 thereon, which pulls the cable taut and stretches the loosened skin. Continued operation of the reel 42 draws the rolling carriage 48 up the curved portion 23 of the guide rail, so that the skin follows the carriage 48. Since the carriage is anchored to the guide rails by the wheels 61 and 62, the distance of the carriage from the carcass changes, as well as the angular direction of pull, progressively as the carriage is hauled up the curved portion of the guide rail. The skin continues to pull loose from the neck, shoulders and back of the carcass (see FIGS. 1 and 3). As the carriage 48 nears the vertical portion 24 of the guide rail, the angle of pull is such that the hide pulls loose from the back and, finally, the rump, as shown in full lines, FIG. 4. As the carriage reaches the forwardly inclined portion 25 of the said rail and moves upwardly thereon, the hide is pulled clear of the rear quarters and tail of the carcass, as shown in dotted lines, FIG. 4. With the carcass freed of the hide, the front legs may be freed from the chain 16 and the stripped carcass moved along the track 1, making space for the next carcass at the site of the hide pulling apparatus.

By reversing the controls 44 and 45, the reel 42 unwinds the cable therefrom and allows the carriage to return to the lower end of the guide rail, carrying the stripped hide therewith, so that the clamps on the ends of the chains 63 and 64 may be released and the hide removed, to make ready for the next carcass.

The method of the present invention is many times faster than by hand work and eliminates knife cuts and scores that damage the hides. The hides are clean and the carcasses are very acceptable.

Since the pulling apparatus involves, as the essential elements thereof, only a simple rolling carriage connected by a cable with a winding reel and a rail for guiding the carriage under pull of the cable, the result is accomplished with a minimum of equipment and without the use of chain conveyors, pivoted booms, boom actuators, and any re-eeving of the pulling cable during the pulling cycle. It is also obvious that the chains 63 and 64, as well as the cable hook, may remain connected with the carriage.

What I claim and desire to secure by Letters Patent is:
1. An apparatus for pulling the hide from the carcass of a slaughtered animal, including:
   means for bodily suspending a carcass by the rear legs thereof
   means for engaging the front legs of said carcass to maintain it in a generally linear direction,
   a support extending longitudinally of the carcass when carried by said carcass suspending means,
   a guide rail carried by said support,
   a carriage movable along said guide rail,
   a reel rotatably mounted on said support,
   means for rotating said reel,
   a cable having one end fixed to said carriage and the other to the reel to permit winding of the cable thereon, and
   means for connecting a loosened part of the hide with the carriage for pulling the hide loose from the carcass,
   said guide rail controlling the angular pull of said connecting means as the hide pulls off of said carcass.
2. An apparatus for pulling the hide from the carcass of a slaughtered animal, including:
   means for bodily suspending a carcass by the rear legs thereof
   means for engaging the front legs of said carcass to maintain it in a generally linear direction,
   a guide rail,
   means supporting the guide rail longitudinally of the carcass when said carcass is carried by said suspending means,
   a carriage fixed to and movable along the guide rail,
   a reel rotatably mounted on said supporting means at one end of the guide rail and in projection from said rail on the side of the carcass supporting means,
   a cable having one end fixed to the carriage and the other fixed to the reel,
   a flexible connection for attachment to skin of the front legs of the carcass and with the carriage to pull the hide from the carcass under pull of the cable,
   said guide rail generally following the contour of the carcass on the side of the guide rail for controlling the angle of pull of said flexible connection as the carriage moves to control the angle that the hide pulls off of said carcass, and
   means for rotating the reel.

3. An apparatus for pulling the hide from the carcass of a slaughtered animal as described in claim 2, and including:
wheels on the carriage and contained in guide grooves at opposite sides of the guide rail to secure the carriage in rolling support on the guide rail.

4. An apparatus for pulling the hide from the carcass of a slaughtered animal, including:
an overhead track,
means for bodily suspending the carcass by the rear legs from said track,
means for anchoring the front legs of the carcass,
a guide rail having a lower portion curving away and upwardly from said anchoring means into a substantially perpendicular portion terminating in a forwardly inclined treminal portion above said track,
means rigidly supporting said guide rail including a projecting portion extending forwardly over said inclined terminal portion,
a hoist carried by said projecting portion and including a winding reel,
a carriage movable along the guide rail,
a cable having one end fixed to the winding reel,
flexible members fixed to the carriage for connection of portions of the skin of the front legs, and
means connecting the cable with the carriage for pulling the carriage upwardly along the track responsive to winding of the cable on said reel.

5. An apparatus for pulling the hide from the carcass of a slaughtered animal, including:
an overhead track,
means for bodily suspending the carcass by the rear legs from said track,
means for anchoring the front legs of the carcass,
a guide rail having a lower portion curving away and upwardly from said anchoring means into a substantially perpendicular portion terminating in a forwardly inclined terminal portion above said track,
said guide rail being of I-beam cross section providing guideways at opposite sides of the guide rail,
means rigidly supporting said guide rail including a fixed arm extending forwardly over the inclined terminal portion,
a hoist carried by said arm and including a winding reel,
a carriage movable along the guide rail,
a cable having one end fixed to the winding reel and the other end connected with the carriage,
flexible members fixed to the carriage for connection of the skin of the front legs to the carriage, and
wheels on the carriage operating in the guideway of the guide rail to control the angular pull of the flexible members during lift of the carriage to control the angles at which the hide pulls from the carcass.

6. An apparatus for pulling the hide from the carcass of a slaughtered animal, said apparatus including means for securing the front and rear legs of the carcass for holding the carcass in a generally linear position,
a frame having a base portion for attachment to the floor of a building and having an upright portion for attachment to an adjacent wall of the building,
a guide rail having a lower portion curving away and upwardly from said base portion toward the upright portion and having a perpendicular portion extending along the upright portion of the frame and terminating in a forwardly inclined terminal portion,
an arm fixed to the upper end of the upright portion of the frame and to said terminal portion,
a hoist carried by said arm and including a winding reel,
a carriage movable along the guide rail,
a cable having one end fixed to the winding reel,
flexible members for connection with portions of the skin of the front legs, and
means on said carriage for connecting the cable with said flexible members for stripping off the hide of the carcass upon winding of the cable on said reel.

References Cited

UNITED STATES PATENTS

| | | | |
|---|---|---|---|
| 2,494,138 | 1/1950 | De Moss | 17—21 X |
| 3,129,454 | 4/1964 | Johnson | 17—21 |
| 3,229,328 | 1/1966 | Schmidt | 17—21 |
| 3,274,639 | 9/1966 | Knauss | 17—21 |

FOREIGN PATENTS 251,963  5/1964  Australia.

OTHER REFERENCES

The National Provisioner, Mar. 17, 1962, vol. 146, No. 11, page 18.

LUCIE H. LAUDENSLAGER, *Primary Examiner.*